(12) United States Patent
Harben, III

(10) Patent No.: US 8,939,820 B2
(45) Date of Patent: Jan. 27, 2015

(54) PAW CUTTER SYSTEM AND METHOD

(71) Applicant: Grover S. Harben, III, Gainesville, GA (US)

(72) Inventor: Grover S. Harben, III, Gainesville, GA (US)

( * ) Notice: Subject to any disclaimer, the term of this patent is extended or adjusted under 35 U.S.C. 154(b) by 0 days.

(21) Appl. No.: 14/259,728

(22) Filed: Apr. 23, 2014

(65) Prior Publication Data
US 2014/0349559 A1  Nov. 27, 2014

Related U.S. Application Data

(60) Provisional application No. 61/854,406, filed on Apr. 23, 2013.

(51) Int. Cl.
*A22C 18/00* (2006.01)
*A22C 21/00* (2006.01)

(52) U.S. Cl.
CPC .................................. *A22C 21/0023* (2013.01)
USPC .......................................................... 452/166

(58) Field of Classification Search
USPC ......... 452/163, 164, 166, 167, 170, 172, 178, 452/182, 149, 154
See application file for complete search history.

(56) References Cited

U.S. PATENT DOCUMENTS

| 4,183,118 | A  | * | 1/1980 | Graham et al. | 452/115 |
| 6,283,848 | B1 | * | 9/2001 | Berry | 452/166 |
| 6,450,872 | B1 | * | 9/2002 | Haley et al. | 452/166 |
| 6,749,497 | B2 | * | 6/2004 | Haley et al. | 452/167 |
| 8,202,143 | B1 | * | 6/2012 | Taylor | 452/166 |
| 8,562,397 | B1 | * | 10/2013 | Palmateer et al. | 452/183 |
| 2003/0190880 | A1 | * | 10/2003 | Haley et al. | 452/167 |

* cited by examiner

Primary Examiner — Richard Price, Jr.
(74) Attorney, Agent, or Firm — FisherBroyles, LLP

(57) ABSTRACT

A paw cutting system for removing a poultry paw from a shackle conveyed along a shackle conveyor line and then cutting the leg of the paw to remove the knuckle is provided. The paw cutter has a guide bar substantially aligned with the shackle conveyor line that urges the paw to a central cavity of the shackle. The paw is discharged from the central cavity into a lateral notch formed in two opposed discs positioned adjacent to an end of the guide bar. The two opposed discs are rotatable and move the paw from the guide bar to a blade. As the paw is moved to the blade, the two discs stretch the paw so that the blade can cleanly cut the paw. The cut paw product can be placed onto a belt or other device in an ordered manner.

20 Claims, 7 Drawing Sheets

PAW CUTTER SYSTEM AND METHOD

CROSS-REFERENCE TO RELATED APPLICATIONS

This application claims the benefit of and priority to U.S. Provisional Application No. 61/854,406, filed Apr. 23, 2013, which is hereby incorporated in its entirety by this reference.

FIELD OF THE INVENTION

The present invention relates generally to a paw cutter for removing the knuckle from a poultry paw. More specifically, the invention pertains to systems and methods for consistently cutting poultry paws in an ordered manner.

BACKGROUND OF THE INVENTION

A "paw" refers to the foot of poultry, such as chicken, turkey, quail, duck and the like, once the foot is removed from the bird. In conventional poultry processing plants, the bird is hung on an overhead conveyor and killed. As the bird continues to move along the overhead conveyor (referred to as a picking line), the foot or paw can be cut or otherwise separated from the rest of the carcass.

To have a paw that can be sold requires that the knuckle (or knee) of the paw be removed. Further, the paw needs to be correlated to the carcass from which it was cut. That is, the paw needs to be indexed so that the paw is traceable to the bird from which it was cut. This is required so that, if a carcass is condemned, the corresponding paws can be identified and also condemned.

Conventional paw cutters can cut the paw while the paw is in a shackle of a picking line. Cutting while in the shackle though can cause quality issues and/or improper cuts. Other conventional paw cutters can remove the foot from the shackle for cutting. However, moving the foot from the shackle can lose the indexing of the paw with the carcass. Further, there is also inconsistent cutting with conventional paw cutters.

Accordingly, it remains desirable in the pertinent art to provide a paw cutter that cuts consistently and provides indexing so that the paw can be traced to a carcass.

SUMMARY

Presented herein is a paw cutter for removing a poultry paw from a shackle conveyed along a longitudinal axis on a shackle conveyor line, and then cutting the leg of the paw to remove the knuckle. The paw cutter comprises at least one of guide bar, a holding wheel and a blade. In one aspect, the guide bar can be configured to remove the paw from a shackle conveyed along the shackle conveyor line and position a portion of the paw in a notch defined in the holding wheel. The holding wheel can rotate and move the paw into contact with the blade, which cuts the knuckle off of the paw. The cut paw can then be positioned on a conveyor or other device in the order in which the paw was cut.

In one aspect, the guide bar can be a substantially linear elongate bar positioned adjacent to and substantially aligned with a portion of the shackle conveyor line. In another aspect, the guide bar can be substantially linear and parallel to a longitudinal axis of the shackle conveyor line. At least a portion of the guide bar can be upwardly inclined relative to the shackle conveyor line such that a first end of the guide bar is spaced from the shackle conveyor line a first distance and a second end of the guide bar is spaced from the shackle conveyor line a second distance that is less than the first distance. As a shackle is conveyed by the shackle conveyor line toward the second end of the guide bar, the poultry paw is urged by the guide bar from a proximal end of the shackle to a central cavity of the shackle so that the paw can be removed from the shackle.

Upon being conveyed to the end of the guide bar, a portion of the paw can be positioned in the holding wheel. In one aspect, the holding wheel can be positioned adjacent to the second end of the guide bar. A plurality of notches can be defined in an outer edge of the holding wheel, wherein each notch of the plurality of notches can be configured to contain a portion of a paw therein. In one aspect, at least one face of the holding wheel can be substantially parallel to a plane containing the longitudinal axis of the shackle conveyor line. In another aspect, the holding wheel can be a rotatable wheel that can rotate around a rotation axis that is substantially perpendicular to the longitudinal axis of the shackle conveyor line. Thus, a paw positioned in a notch can rotate from the guide bar to the blade in a direction substantially parallel to the longitudinal axis of the shackle conveyor line.

In one aspect, the holding wheel can comprise two opposed discs that are spaced from each other a predetermined wheel distance to form a disc gap. In another aspect, the two opposed discs can be substantially parallel to each other. Optionally, according to another aspect, the two opposed discs can be positioned at an acute angle to each other. In this aspect, the predetermined wheel distance can vary from a first position, in which a first portion of each of the two opposed discs contacts or almost contacts the opposed disc and the predetermined wheel distance is zero, to a second position, in which a second portion of each of the two opposed discs is spaced from each other and the predetermined wheel distance is greater than zero.

The blade can be positioned adjacent to the holding wheel and configured to cut the knuckle from the paw positioned in a notch of the plurality of notches of the holding wheel.

Related methods of operation are also provided. Other apparatuses, methods, systems, features, and advantages of the paw cutter will be or become apparent to one with skill in the art upon examination of the following figures and detailed description. It is intended that all such additional apparatuses, methods, systems, features, and advantages be included within this description, be within the scope of the paw cutter, and be protected by the accompanying claims.

DESCRIPTION OF THE INVENTION

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "shackle" includes aspects having two or more shackles unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 1:
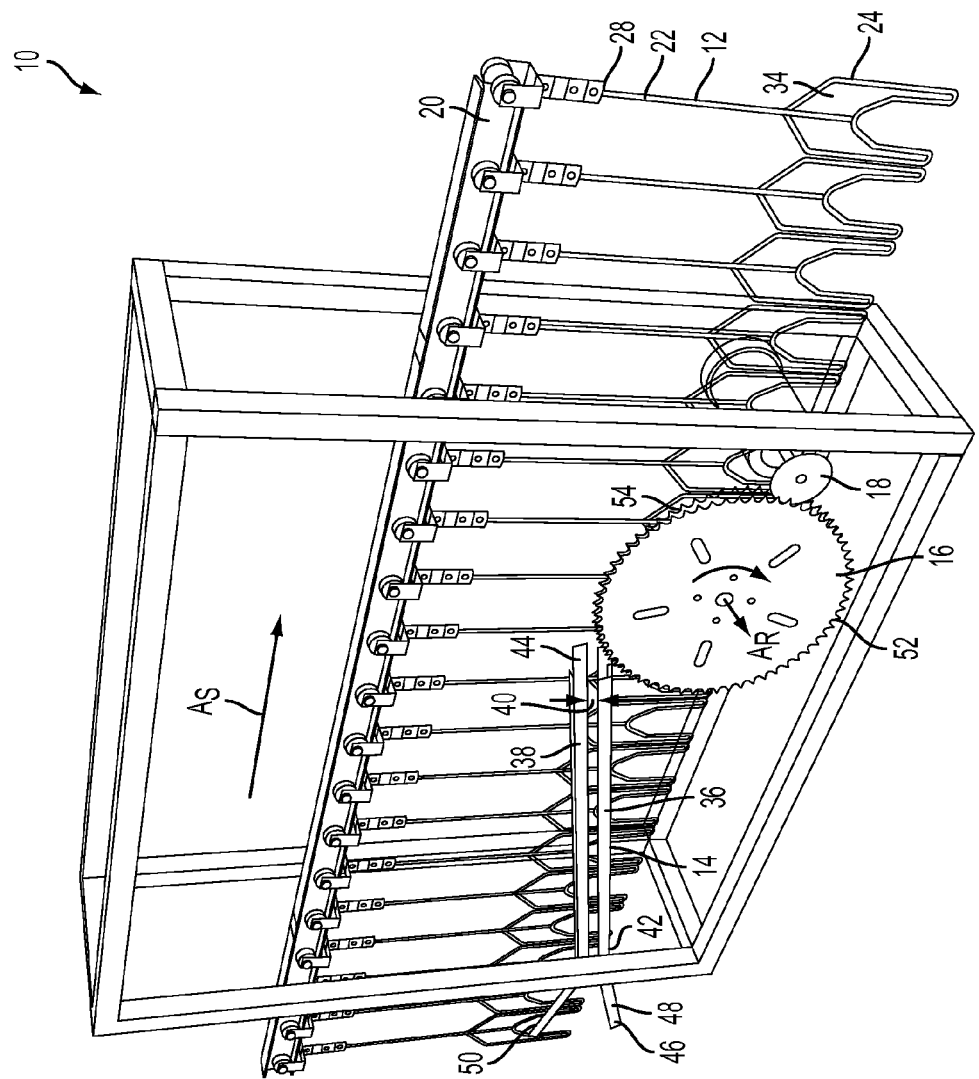
FIG. 1 is a perspective view of the paw cutter system of the present application, showing a shackle, a guide bar, a holding wheel and a blade, according to one aspect.
Figure 6:
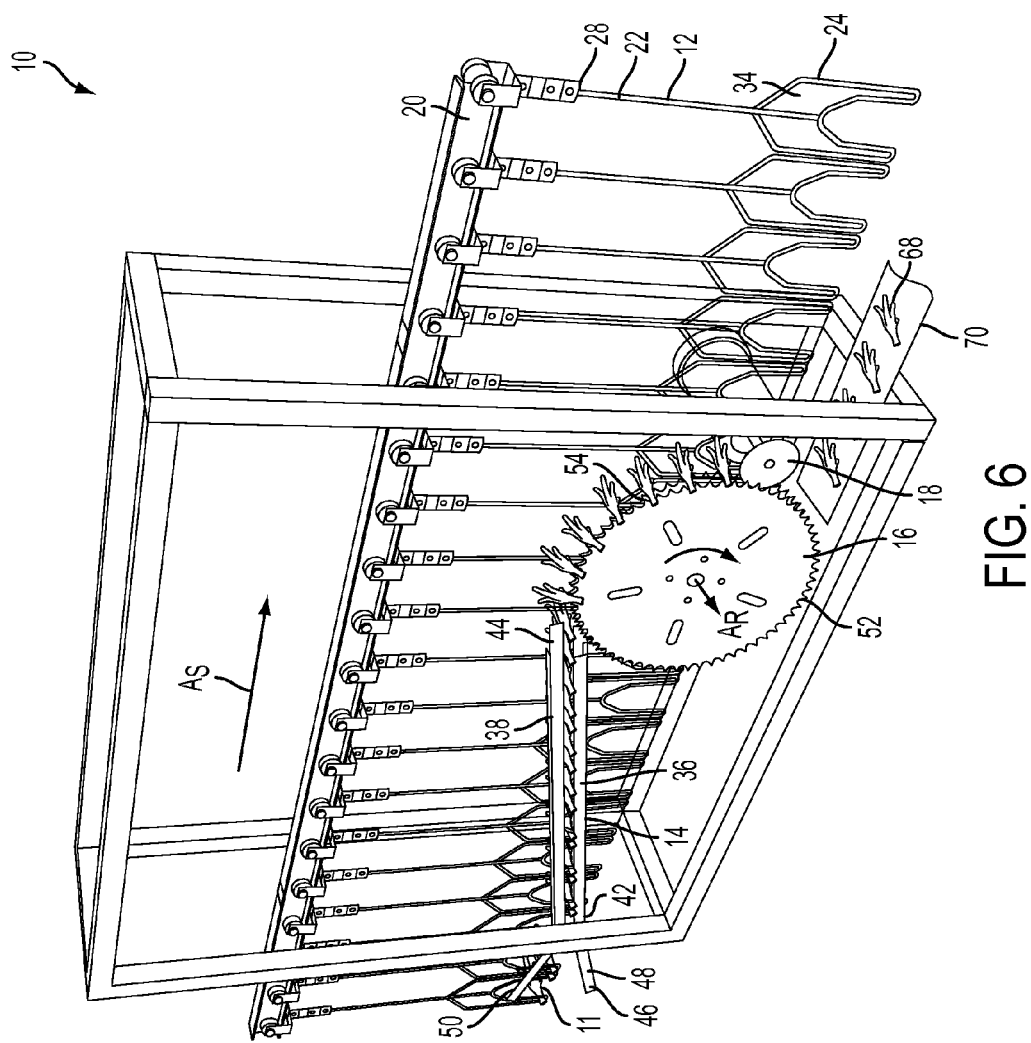
FIG. 6 is a perspective view of the system of FIG. 1 while cutting paws, according to one aspect.

The application relates to paw cutting systems and methods for removing the knuckle from the foot of poultry such as a chicken, quail, turkey, duck and the like, while keeping the paw in order so that a paw can be traced back to a bird. In one aspect, and as illustrated in FIG. 1, the paw cutting system 10 comprises at least one of: a guide bar 14, a holding wheel 16 and a blade 18. As will be described more fully below, a shackle 12 holds the paw 11 of a bird (as illustrated in FIG. 6). The guide bar can urge the paw from the shackle and/or position the paw for removal from the shackle. Upon removal from the shackle, the paw 11 can be placed into the holding wheel. The holding wheel can rotate until the paw is moved into contact with the blade, which cuts the knuckle off of the paw.

The at least one shackle 12 can be configured to hold at least a portion of the paw such that the knuckle side of the paw is on a first side of the shackle and the claw side of the paw is on an opposed, second side of the shackle 12. In one aspect, the at least one shackle can comprise a plurality of shackles. Each shackle 12 can be coupled to a shackle conveyor line 20, according to another aspect. The shackle conveyor line can be configured to move the shackle through a processing plant. For example, the shackle conveyor line 20 can be configured to move the shackle adjacent to or near the guide bar 14. Optionally, the shackle conveyor line 20 can be an overhead conveyor line. In one aspect, at least a portion of the shackle conveyor line can be substantially linear having a longitudinal axis $A_S$. That is, the shackle conveyor line 20 can be positioned such that a shackle 12 traveling on the shackle conveyor line moves substantially linearly along the longitudinal axis $A_S$ for at least a predetermined distance.

Figure 2:
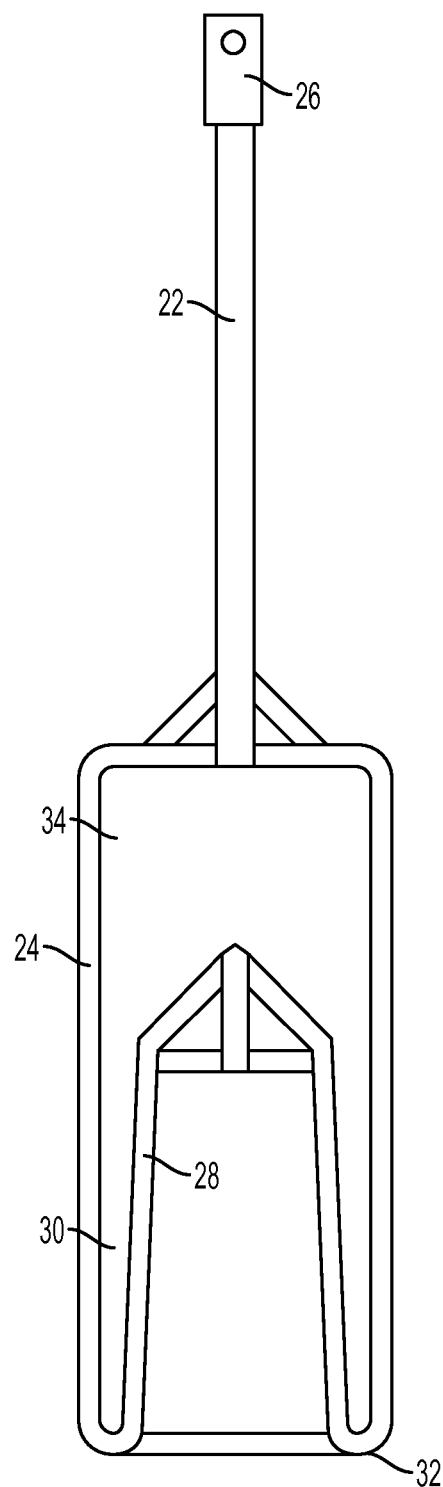
FIG. 2 is a elevational view of the shackle of FIG. 1.

The shackle 12 is illustrated in FIG. 2, according to one aspect, and can comprise a central member 22 and an outer perimeter member 24. A distal end 26 of the shackle can be configured for attachment to the shackle conveyor line 20. Two inner members 28 can be spaced from the outer perimeter member and can cooperate with the outer perimeter member 24 to create a pair of slots 30 ending at a proximal end 32 of the shackle. In another aspect, at least a portion of the inner members can taper towards the outer perimeter member. In still another aspect, at least a portion of the inner members 28 can be spaced from the outer perimeter member a predetermined distance so that the slots are sized to receive the legs of the bird. In one aspect, a central cavity 34 can be defined by a portion of the outer perimeter member. In this aspect, the central cavity can be configured to allow the paw to be inserted into and/or removed from the shackle 12.

Figure 7:
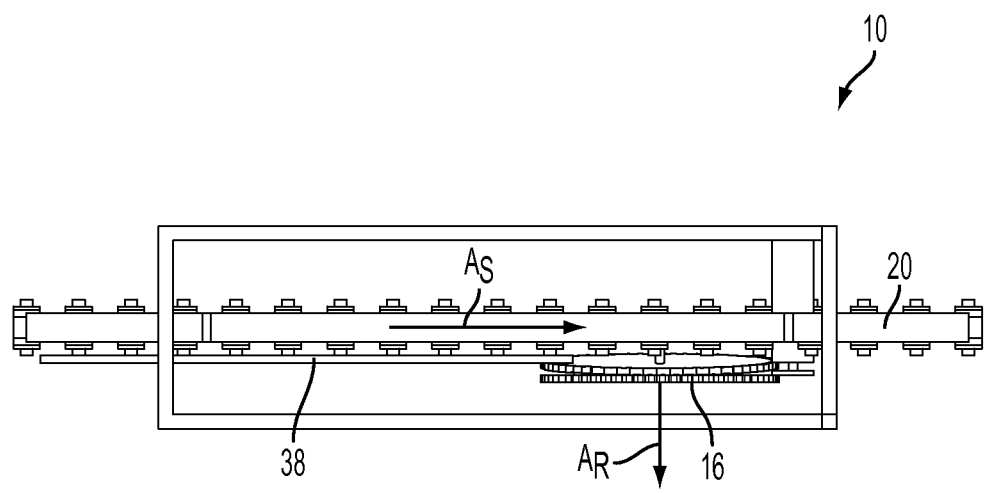
FIG. 7 is a top plan view of the system of FIG. 1.

In one aspect, the guide bar 14 can be an elongate, substantially linear bar positioned adjacent to a portion of the shackle 12 traveling on the shackle conveyor line 20. For example, the guide bar can be adjacent to the first side of the shackle (i.e., the knuckle side of the paw). Alternatively, however, the guide bar 14 can be adjacent to the second side of the shackle (i.e., the claw side of the paw). In one aspect, at least a portion of the guide bar can be substantially parallel to the longitudinal axis $A_S$ as illustrated in FIG. 7. That is, at least a portion of the guide bar 14 can be positioned substantially parallel to the shackle as the shackle moves substantially linearly along the longitudinal axis $A_S$. Optionally, the entire elongate guide bar can be substantially parallel to the longitudinal axis $A_S$. In another aspect, at least a portion of the guide bar 14 can be positioned at an acute angle relative to the longitudinal axis $A_S$. For example, the angle formed between the guide bar and the longitudinal axis $A_S$ can be about 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 20 degrees, 30 degrees, or greater than about 30 degrees.

Figure 3:
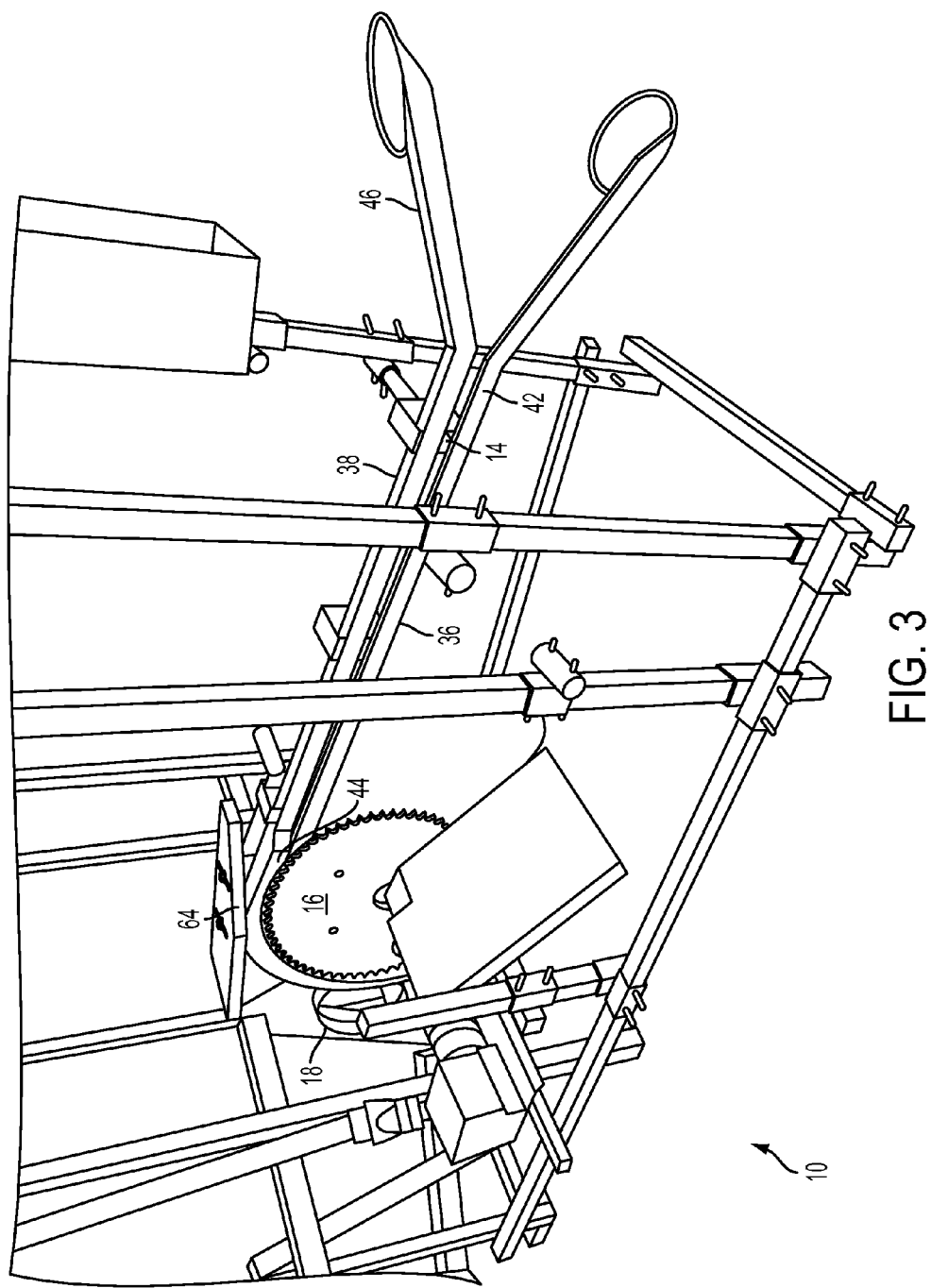
FIG. 3. is a perspective view of the paw cutter system of the present application, showing a guide bar, a holding wheel and a blade, according to one aspect.

As illustrated in FIGS. 1 and 3, the guide bar 14 can comprise a lower bar 36 and an upper bar 38 spaced from the lower bar a predetermined bar distance forming a bar gap 40, according to one aspect. In another aspect, the bar gap can be sized large enough that a portion of the paw 11 can slide therein. Optionally, the bar gap can be sized small enough that the knuckle of a bird cannot slide therein. That is, in one aspect, the bar gap can be sized so that the paw of the bird can slide longitudinally therein along the longitudinal axis $A_S$, while being restricted from moving in a transverse direction by the knuckle on one side of the paw 11 and the claw on the second side of the paw. In a further aspect, the bar gap can be constant along the length of the guide bar 14. Alternatively, in another aspect, the bar gap can vary. For example, the bar gap can be greater at a first end 42 of the lower bar than at a second end 44 of the lower bar 36.

In one aspect, the guide bar 14 can be upwardly inclined relative to the shackle conveyor line 20. In another aspect, the lower bar 36 and/or the upper bar 38 can be upwardly inclined relative to the shackle conveyor line. That is, the first end 42 of the lower bar can be spaced from the shackle conveyor line a first distance $D_1$, and the second end 44 of the lower bar 36 can be spaced from the shackle conveyor line 20 a second distance $D_2$ that is less than the first distance. In another aspect, at least a portion of the upper bar 38 can be substantially parallel to the lower bar.

The guide bar 14 can further comprise a guide bar entry 46, according to one aspect. In this aspect, the guide bar entry can have a downward pointing first portion 48 coupled to the first end 42 of the lower bar 36, and an upward pointing second portion 50 coupled to the first end of the upper bar 38. The downward pointing first portion and the upward pointing second portion can be shaped, sized and positioned to guide a portion of the paw 11 into the bar gap 40 as the paw is conveyed by the shackle 12. That is, the downward pointing first portion 48 and the upward pointing second portion 50 of the guide bar entry 46 can act as a funnel to urge the paw into the bar gap 40.

The holding wheel 16 can be a wheel configured to rotate and move the paw 11 from the guide bar 14 and/or the shackle 12 into contact with the blade 18. In one aspect, the holding wheel can be positioned near or adjacent to the lower bar 36 of the guide bar so that as the paw leaves the shackle, the paw can be positioned on the holding wheel. Upon entering the holding wheel 16, the paw can rotate around the perimeter of the holding wheel until the paw is moved into contact with the blade 18, which cuts the knuckle off.

In one aspect, the holding wheel 16 defines a plurality of lateral notches 52 around the outer edge 54 (or perimeter edge) of the wheel. Each of the notches can be sized and shaped to contain a portion of the paw, such as the leg of the paw, therein.

As illustrated in the figures, the holding wheel 16 can be positioned substantially aligned with the guide bar 14 and/or the shackle 12. In one aspect, a paw 11 moving substantially linearly along the longitudinal axis $A_S$ by a shackle of the shackle conveyor line 20 can continue to move substantially linearly along the longitudinal axis $A_S$ around the holding wheel. In another aspect, the holding wheel 16 can rotate in a holding wheel direction (substantially clockwise as indicated by the arrow in FIG. 1) and at a holding wheel rotational speed.

In one aspect, at least a portion of the holding wheel 16 can be positioned parallel to the shackle conveyor line 20 and/or the guide bar 14. That is, as the holding wheel rotates, at least a portion of the outer edge 54 of the holding wheel 16 can move in a plane that is substantially parallel to the shackle conveyor line and/or the guide bar. For example, a paw 11 positioned in the bar gap 40 of the guide bar 14 can move in a direction substantially parallel to the longitudinal axis $A_S$ of the shackle conveyor line, and the paw can continue to move in a direction substantially parallel to the longitudinal axis $A_S$ upon being positioned in the rotating holding wheel. In another aspect, a rotational axis $A_R$ of the holding wheel 16 can be substantially perpendicular to the longitudinal axis $A_S$ of the shackle conveyor line 20 (as illustrated in FIG. 7). Thus, at least a portion of the outer edge 54 of the holding wheel can move in a direction substantially parallel to the longitudinal axis $A_S$ of the shackle conveyor line. In yet another aspect, at least one face of the holding wheel 16 can rotate in a plane substantially parallel to the longitudinal axis $A_S$ of the shackle conveyor line 20.

The holding wheel 16 can be formed from a single disc, according to one aspect. However, in another aspect and with reference to FIGS. 4 and 5, the holding wheel can comprise two opposed discs 56, 58 spaced from each other a predetermined wheel distance to form a disc gap 66. In a further aspect, the predetermined wheel distance can be constant at all places along the outer edge 54 of the discs (that is, a first disc 56 and a second disc 58 can be substantially parallel to each other). In this aspect, the rotational axis $A_{R1}$ of the first disc and the rotational axis $A_{R2}$ of the second disc can be substantially parallel to and aligned with each other. Alternatively, in another aspect, the predetermined wheel distance can vary. For example, the first disc 56 and the second disc 58 can be positioned such that in a first position, a first portion 60 of each disc touches or almost touches the opposed disc (that is, the disc gap 66 can be zero or close to zero), and in a second position, a second portion 62 of each disc can be spaced from each other such that the disc gap is greater than zero. In this aspect, the rotational axis $A_{R1}$ of the first disc can be at an acute angle relative to the rotational axis $A_{R2}$ of the second disc. For example, the angle formed between the rotational axis $A_{R1}$ of the first disc and the rotational axis $A_{R2}$ of the second disc can be about 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 20 degrees, 30 degrees, 45 degrees, or greater than about 45 degrees. In another aspect, the rotational axis $A_R$ of at least one of the first disc 56 and the second disc 58 can be substantially perpendicular to the longitudinal axis $A_S$ of the shackle conveyor line 20.

In one aspect, the holding wheel 16 (whether comprised of a single wheel or a plurality of discs) can be coupled to the shackle conveyor line 20 in order to maintain the proper timing between the holding wheel and the shackle conveyor line. For example, the holding wheel 16 can be mechanically coupled to the shackle conveyor line 20 with gears, belts, chains, cables, and the like so that as a paw leaves a shackle 12, it is positioned in a notch 52 of the holding wheel. In another example, the holding wheel 16 can be electronically coupled to the shackle conveyor line 20. In this example, a processor or other electronic device can control the timing between the holding wheel and the shackle conveyor line so that as a paw leaves a shackle 12, it is positioned in a notch 52 of the holding wheel.

The blade 18 can be a fixed blade, a rotating blade or any combination of blades. In one aspect, if the blade is a rotating blade, the blade 18 can rotate in a blade rotation direction that is opposite of the holding wheel rotation direction. For example and with reference to FIG. 1, if the holding wheel 16 rotates clockwise as indicated, the blade can rotate counter clockwise. In another aspect, the blade can be positioned adjacent to the holding wheel so that the blade 18 can contact a paw 11 held in a notch 52 of the holding wheel. In still another aspect, if the holding wheel 16 comprises two discs 56, 58, the blade can be positioned so that a portion of the blade 18 extends into the disc gap 66 between the two discs. For example, the blade can be positioned adjacent to the second portion 62 of each disc (wherein the disc gap is greater than zero.) Optionally, if the holding wheel comprises a single disc, a radial groove can be formed around the perimeter of the holding wheel 16 for receiving a portion of the blade 18 therein.

In a further aspect, the position of the blade 18 relative to the holding wheel 16 can be adjusted. For example, if the holding wheel comprises two discs 56, 58, the blade can be selectively positioned closer to the first disc or the second disc to allow the length of the cut to be changed. That is, the position of the blade can be adjusted in a direction substantially parallel to the rotational axis $A_R$ of the holding wheel so that a user can selectively alter the length of the cut and therefore the paw size.

Figure 4:
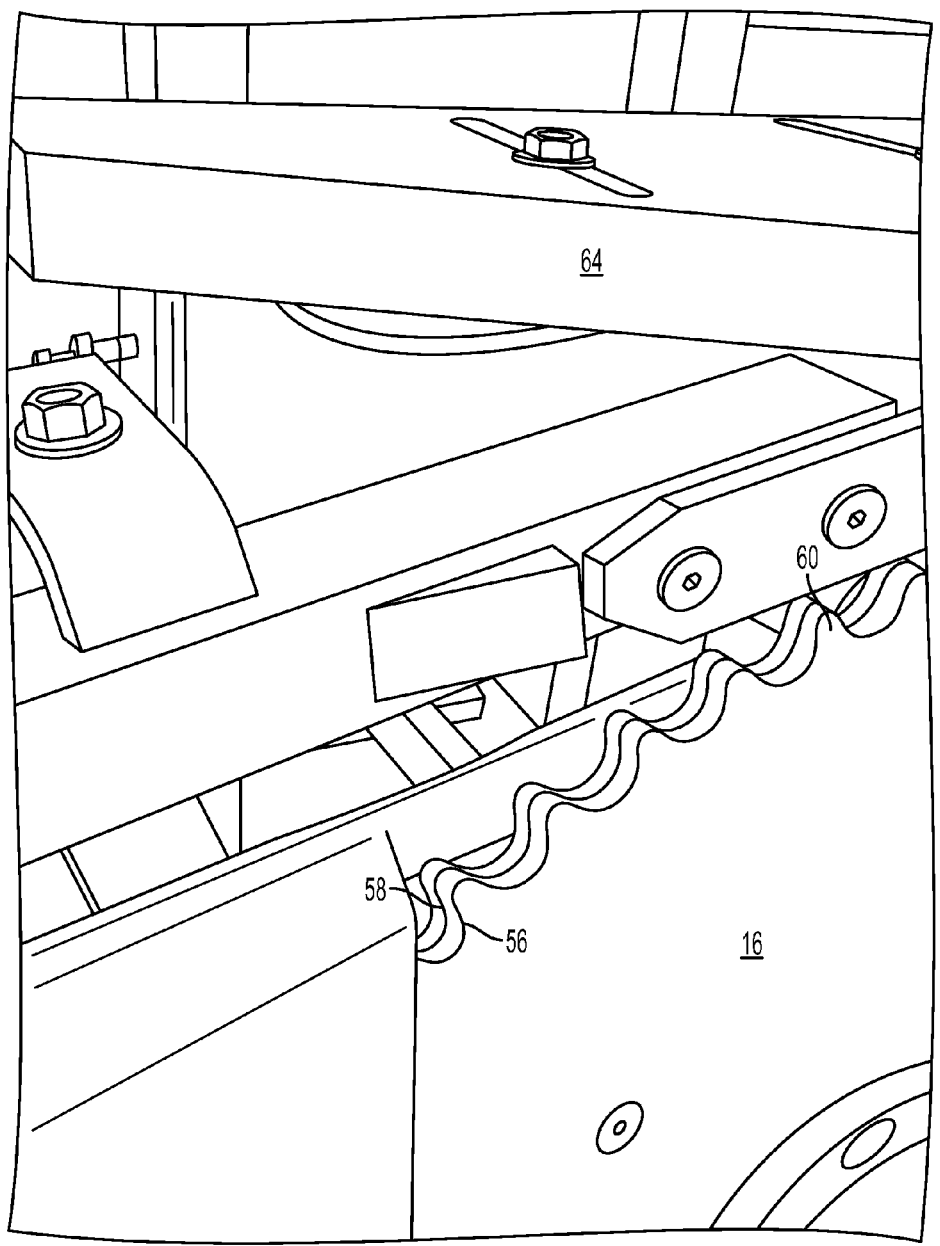
FIG. 4 is a perspective view of a holding wheel comprising two opposed discs.
Figure 5:
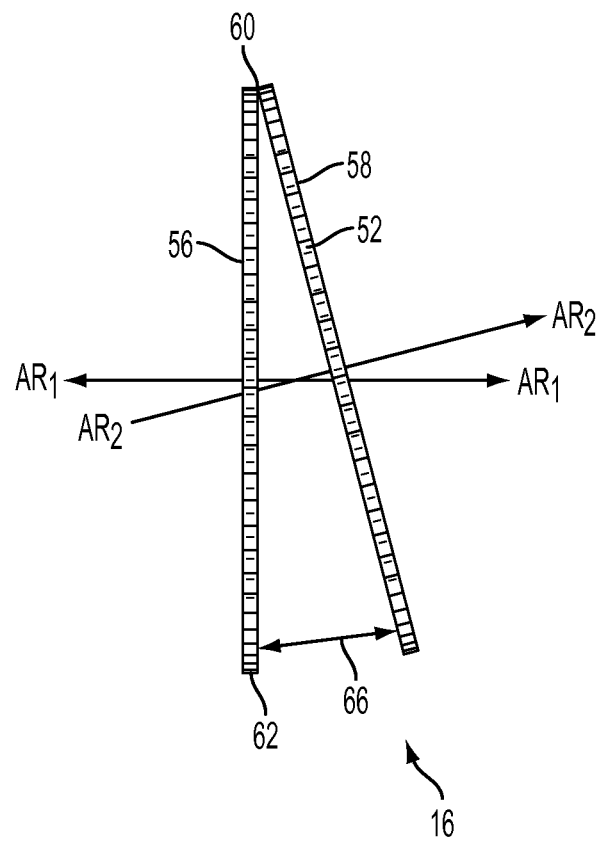
FIG. 5 is a side elevational view of the holding wheel of FIG. 4.

The paw cutting system 10 can further comprise a shackle element 64 (illustrated in FIGS. 3 and 4). In one aspect, the shackle element can have an edge positioned at angle relative the longitudinal axis $A_S$ of the shackle conveyor line 20. In another aspect, the shackle element 64 can be positioned between the shackle conveyor line and a portion of the holding wheel 16. When contacted by a shackle moving along the longitudinal axis $A_S$, the edge of the shackle element can urge the shackle laterally away from the guide bar 14 and/or the holding wheel 16. In another aspect, the shackle element 64 can have a shackle element width configured to urge the shackle laterally away from the guide bar and/or the holding wheel a predetermined shackle distance. The predetermined shackle distance can be large enough so that the central cavity 34 of the shackle 12 is not positioned around a portion of a paw. In a further aspect, the predetermined shackle distance can vary based on the size of the paw and/or the alignment between the guide bar 14 and the shackle conveyor line 20. For example, if the guide bar is at an acute angle relative to the longitudinal axis $A_S$ of the shackle conveyor line, the distance required to move the central cavity of the shackle from around a portion of a paw can be less than if the guide bar 14 is substantially parallel to the longitudinal axis $A_S$ of the shackle conveyor line 20. In this example then, when the guide bar is at an acute angle relative to the longitudinal axis $A_S$ of the shackle conveyor line, the predetermined shackle distance is smaller than for an aligned guide bar and the shackle element 64 can be smaller.

The paw cutting system 10 can be formed from conventional materials, such as for example and without limitation, polymeric materials and/or stainless steel. In one aspect, the holding wheel 16, the blade 18 and/or the shackle conveyor line 20 can be driven by any pneumatic, electric, or other motor or system. As can be appreciated, gears, belts, chains, cams, and the like can also be utilized to urge movement of the holding wheel, the blade and/or the shackle conveyor line as desired. In another aspect, the holding wheel 16, the blade 18 and/or the shackle conveyor line 20 can be driven by a single motor or system. Optionally, a plurality of motors can be used to drive the holding wheel, the blade and/or the shackle conveyor line.

In a conventional poultry processing systems, the bird to be processed is positioned in the shackle 12 by the feet of the bird. The legs of the bird are cut above the knuckle of the leg and the body of the bird is removed, leaving the two paws of the bird hanging in the shackle and moving on the shackle conveyor line 20. In order to use the paw cutting system 10, the shackle conveyor line 20 can be positioned adjacent to the guide bar 14 such that the shackle conveyor line can carry the paw towards the guide bar. The guide bar entry 46 can align a portion of the paw (such as the leg) so that the portion of the paw can be positioned in the bar gap 40 between the lower bar 36 and the upper bar 38 of the guide bar 14. Note that when positioned in the guide bar, the paw is restricted from moving laterally by the claw of the paw on one side of the guide bar 14 and the knuckle of the paw on the other side of the guide bar.

At least a portion of the shackle conveyor line 20 moves in a substantially linear direction along the longitudinal axis $A_S$. Because the guide bar 14 is upwardly inclined relative to the shackle conveyor line, movement of the shackle 12 (and therefore the paw) towards the second end 44 of the guide bar 14 causes the guide bar to urge the paw upwards relative to the shackle from the proximal end 32 of the shackle towards the central cavity 34 of the shackle. Upon reaching the second end of the guide bar, at least a portion of the paw (for example, at least a portion of the leg) can be positioned in the central cavity 34 of the shackle.

Near the second end 44 of the guide bar 14, the shackle 12 can contact a portion of the shackle element 64 which begins to urge the shackle laterally away from the guide bar 14 and/or the holding wheel 16. At the second end 44 of the guide bar, the leg of the paw 11 can be fed from the guide bar into a notch 52 of the plurality of notches of the holding wheel 16. Almost simultaneous with this, the shackle element 64 can urge the shackle 12 laterally away from the holding wheel far enough that the leg of the paw can be removed from the central cavity 34 of the shackle.

Upon positioning in a notch 52 of the holding wheel 16, at least a portion of the paw 11 can rotate around the outer edge 54 of the holding wheel in a plane containing the longitudinal axis $A_S$ of the shackle conveyor line. As the paw rotates around the outer edge of the holding wheel, the paw is brought into contact with the blade 18, which cuts the knuckle off of the paw to form the desired paw product 68. If the holding wheel comprises two discs, as the paw rotates around the outer edge of the holding wheel, the paw rotates from the first position, in which the first disc 56 and the second disc 58 touch or almost touch each other, towards the second position in which the discs are spaced from each other. This causes the leg of the bird to become stretched with the outside of one disc contacting the knuckle and the outside of the other disc contacting the claw of the paw 11. In this aspect, the blade 18 can be positioned so that the knuckle is removed when the leg is in the stretched position so that the blade can cleanly and consistently cut each paw.

After being cut, the knuckle can fall into a container or other device for disposal (not shown) on one side of the holding wheel 16, while the desired paw product 68 can drop onto a conveyor 70 or other system which can deliver the paw for further processing and/or inspection in an ordered, indexed manner as illustrated in FIG. 6.

As can be appreciated, the blade 18 can be optional in order to provide a system for removing poultry paws 11 from a shackle 12 and positioning the paw on a conveyor 70 or other paw holding system. That is, in one aspect, a paw holding system can comprise a shackle 12, a guide bar 14 and a holding wheel 16. The shackle, guide bar and holding wheel (and all other elements of the system) can operate as described above to remove the paw from a shackle and position the paw on a conveyor without being cut by the blade.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A paw cutting system for removing a poultry paw from a shackle conveyed along a longitudinal axis on a shackle conveyor line, and then cutting the leg of the paw to remove the knuckle, the paw cutting system comprising:
   a guide bar positioned adjacent to and substantially aligned with a portion of the shackle conveyor line, wherein the guide bar is upwardly inclined relative to the shackle conveyor line such that a first end of the guide bar is spaced from the shackle conveyor line a first distance and a second end of the guide bar is spaced from the shackle conveyor line a second distance that is less than the first distance, wherein the guide bar is substantially linear, and wherein as the shackle is conveyed toward the second end of the guide bar, the poultry paw is urged by the guide bar from a proximal end of the shackle to a central cavity of the shackle;

a holding wheel positioned adjacent to the second end of the guide bar, wherein the holding wheel defines a plurality of notches in an outer edge of the holding wheel, wherein each notch of the plurality of notches is configured to contain a portion of a paw therein, and wherein the holding wheel is configured to move the paw from the guide bar to a blade;

a shackle element having an edge positioned at an acute angle relative to the longitudinal axis of the shackle conveyor line, wherein the shackle element is configured for urging the shackle away from the holding wheel relative to the longitudinal axis of the shackle conveyor line when the paw is positioned in the central cavity of the shackle; and the blade positioned adjacent to the holding wheel, wherein the blade is configured to cut the knuckle from the paw positioned in a notch of the plurality of notches of the holding wheel.

2. The paw cutting system of claim 1, wherein at least one face of the holding wheel is substantially parallel to a plane containing the longitudinal axis of the shackle conveyor line.

3. The paw cutting system of claim 1, wherein the holding wheel is configured to move the paw from the guide bar to the blade in a direction substantially parallel to the longitudinal axis of the shackle conveyor line.

4. The paw cutting system of claim 1, wherein the holding wheel is rotatable around a rotation axis that is substantially perpendicular to the longitudinal axis of the shackle conveyor line.

5. The paw cutting system of claim 1, wherein the holding wheel comprises two opposed discs.

6. The paw cutting system of claim 5, wherein the two opposed discs are substantially parallel to each other.

7. The paw cutting system of claim 5, wherein a rotational axis of at least one of the two opposed discs is substantially perpendicular to the longitudinal axis of the shackle conveyor line.

8. The paw cutting system of claim 5, wherein the two opposed discs are spaced from each other a predetermined wheel distance.

9. The paw cutting system of claim 8, wherein the predetermined wheel distance varies from a first position, in which a first portion of each of the two opposed discs contacts the opposed disc and the predetermined wheel distance is zero, to a second position, in which a second portion of each of the two opposed discs is spaced from each other and the predetermined wheel distance is greater than zero.

10. The paw cutting system of claim 9, wherein a rotational axis of a first disc of the two opposed discs is an acute angle relative to a rotational axis of a second disc of the two opposed discs.

11. The paw cutting system of claim 1, wherein the blade is a rotating blade.

12. The paw cutting system of claim 1, wherein the guide bar is substantially parallel to the longitudinal axis of the shackle conveyor line.

13. A paw cutting system for removing a poultry paw from a shackle conveyed along a longitudinal axis on a shackle conveyor line, and then cutting the leg of the paw to remove the knuckle, the paw cutting system comprising:

a guide bar positioned adjacent to and substantially aligned with a portion of the shackle conveyor line, wherein as the shackle is conveyed from a first end toward a second end of the guide bar, the poultry paw is urged by the guide bar from a proximal end of the shackle to a central cavity of the shackle;

a holding wheel comprising two opposed discs spaced from each other a predetermined wheel distance, wherein the two opposed discs are positioned adjacent to the second end of the guide bar, wherein a plurality of notches are defined in an outer edge of each of the two opposed discs, wherein each notch of the plurality of notches is configured to contain a portion of a paw therein, and wherein the two opposed discs are rotatable and configured to move the paw from the guide bar to a blade;

a shackle element having an edge positioned at an acute angle relative to the longitudinal axis of the shackle conveyor line, wherein the shackle element is configured to urge the shackle away from the holding wheel at an acute angle relative to the longitudinal axis of the shackle conveyor line when the paw is positioned in the central cavity of the shackle; and the blade positioned adjacent to the holding wheel, wherein the blade is configured to cut the knuckle from the paw when the knuckle is in the predetermined wheel distance between the two opposed discs.

14. The paw cutting system of claim 13, wherein the guide bar is a substantially linear elongate guide bar.

15. The paw cutting system of claim 14, wherein the guide bar is upwardly inclined relative to the shackle conveyor line such that a first end of the guide bar is spaced from the shackle conveyor line a first distance and a second end of the guide bar is spaced from the shackle conveyor line a second distance that is less than the first distance.

16. The paw cutting system of claim 15, wherein the guide bar comprises a lower bar and an upper bar spaced from the lower bar a predetermined bar distance forming a bar gap, and wherein the bar gap is sized so that a portion of the paw can slide therein.

17. The paw cutting system of claim 16, wherein the predetermined bar distance is greater at the first end of the guide bar than at the second end of the guide bar.

18. The paw cutting system of claim 13, wherein a rotational axis of at least one of the two opposed discs is substantially perpendicular to the longitudinal axis of the shackle conveyor line, and wherein a rotational axis of a first disc of the two opposed discs is an acute angle relative to a rotational axis of a second disc of the two opposed discs.

19. A method for removing a poultry paw from a shackle conveyed on a shackle conveyor line, and then cutting a leg of the paw to remove a knuckle, the method comprising:

conveying the shackle along a longitudinal axis past a guide bar positioned adjacent to and substantially aligned with a portion of the shackle conveyor line, wherein as the shackle is conveyed from a first end toward a second end of the guide bar, the poultry paw is urged by the guide bar from a proximal end of the shackle to a central cavity of the shackle;

discharging the poultry paw from the central cavity of the shackle into a lateral notch formed in two opposed discs spaced from each other a predetermined wheel distance to form a disc gap, wherein the two opposed discs are positioned adjacent to the second end of the guide bar, wherein the lateral notch is defined in an outer edge of each of the two opposed discs, and wherein two opposed discs are rotatable and configured to move the paw from the guide bar to a blade;

stretching the poultry paw so that a claw of the paw is on an outside of a first disc of the two opposed discs, and the knuckle of the paw is on an outside of a second disc of the two opposed discs; and cutting the stretched poultry paw with a blade to remove the knuckle from the paw, wherein at least a portion of the blade extends into the disc gap.

20. The method of claim 19, wherein the guide bar is a substantially linear elongate guide bar.

* * * * *